United States Patent [19]

Freshwater et al.

[11] Patent Number: 4,559,267

[45] Date of Patent: Dec. 17, 1985

[54] STICK-DOWN SYSTEM FOR ROOFING

[75] Inventors: John G. Freshwater, Ennis; Alfred B. Malmquist, Dallas, both of Tex.

[73] Assignee: Elk Corporation, Ennis, Tex.

[21] Appl. No.: 534,190

[22] Filed: Sep. 21, 1983

[51] Int. Cl.⁴ .............................................. B32B 13/04
[52] U.S. Cl. ..................... 428/352; 428/354; 428/356; 428/489; 428/491; 106/273 R
[58] Field of Search ............ 428/40, 41, 489–491, 428/352, 354, 356; 106/273 R

[56] References Cited

U.S. PATENT DOCUMENTS

| | | |
|---|---|---|
| 2,326,724 | 8/1943 | Fasold et al. |
| 3,386,847 | 6/1968 | McDermott et al. |
| 3,387,981 | 6/1968 | King |
| 3,403,045 | 9/1968 | Erickson et al. |
| 3,493,419 | 2/1970 | Jones et al. |
| 3,518,158 | 6/1970 | Hurst |
| 3,741,856 | 6/1973 | Hurst |
| 3,770,559 | 11/1973 | Jackson |
| 3,937,640 | 2/1976 | Tajima et al. |
| 4,091,135 | 5/1978 | Tajima et al. |
| 4,207,117 | 1/1980 | Espenscheid et al. |

Primary Examiner—Alexander S. Thomas
Attorney, Agent, or Firm—Brumbaugh, Graves, Donohue & Raymond

[57] ABSTRACT

A stick-down system for roofing membrane or shingles includes a sealant of compounded bitumen which is a roofer's flux and/or asphalt resin containing from about 3% to 20% by weight of rubber and/or thermoplastic resins such that said sealant exhibits high tackiness at ambient temperatures and is adhesive to an adjacent asphalt shingle. When roofer's flux is the compounded bitumen of choice, the sealant is adhesive to an adjacent shingle at temperatures in the range of from 90°–130° F. The stick-down system also includes a release sheet having a release substance of either silicone resins, fluorine-containing resins or polyvinylidene chloride.

13 Claims, 6 Drawing Figures

STICK-DOWN SYSTEM FOR ROOFING

BACKGROUND OF THE INVENTION

This invention relates to a stick-down system for use in asphalt roofing membrane or shingles.

The asphalt roofing membrane industry is continually faced with the problem of shingles being blown off roofs when the roof installations are exposed to winds having velocities in the neighborhood of 50 mph or above. Generally, asphalt shingles are manufactured with a sealant applied to one side of the shingle such that, upon roof installation, the sealant is activated by the interface temperature at the point of contact between the factory applied sealant and the asphalt shingle with which it is in contact. Current industry practice requires that the activation temperature of the factory applied sealant be balanced with the necessity for avoiding premature activation during packaging and storage. The consequence of these diverse requirements is a compromise which requires interface temperatures to reach 140°-160° F. before sealing of the shingles in a typical installation occurs. It is the principal object of the present invention to provide a factory-applied stick-down system which exhibits high tackiness at ambient temperature and which permits sealing to occur at significantly reduced temperatures while still avoiding premature activation during packaging and storage.

SUMMARY OF THE INVENTION

This invention relates to a novel stick-down system for asphalt roofing membrane or shingles which includes compounded bitumen (asphalt) sealant material and an attendant release system which satisfies normal asphalt roofing processing, packaging, storage, handling and installation requirements. In the preferred embodiment, the compounded bitumen comprises a roofer's flux containing from about 3% to 20% by weight of rubber and/or thermoplastic resins such that the material exhibits high tackiness at ambient temperatures and is adhesive to an adjacent asphalt shingle at temperatures in the range of from 90°-130° F. In a second embodiment, the compounded bitumen contains asphalt resin rather than roofer's flux. Although the activation temperature of this sealant is in the range 140°-160° F., the composition has an aggressive tackiness which permits the shingle to which it is applied to initially grab an adjacent shingle until the activation temperature is reached. In a third embodiment, the compounded bitumen contains both roofer's flux and asphalt resin which results in a sealant having aggressive tackiness and the capability of sealing roofing shingles over a wide range of temperatures.

The release system of this invention includes a sheet having a release substance such as silicone resin, fluorine-containing resin or polyvinylidene chloride. The release sheet is applied to the shingle and the shingles are packaged such that the release sheet is positioned face-to-face with the sealant material on the adjacent shingle during storage.

DETAILED DESCRIPTION OF THE PREFERRED EMBODIMENTS

In accordance with the present invention, asphalt roofing membrane or singles are manufactured by following conventional procedures. Bituminous prepared roofing has heretofore been extensively manufactured using as a base a fibrous web such as a sheet of roofing felt, impregnating the fibrous web with a bituminous material and coating one or both surfaces of the impregnated web with a weather-resistant bituminous coating material. The bituminous coating material usually contains a mineral filler such as slate flour or powdered limestone. Usually there is applied to the bituminous coating on the surface intended to be exposed to the weather a suitable granular material such as slate granules or mineral surfacing. Finely divided materials such as mica flakes, talc, silica dust or the like may be made adherent to the non-weather exposed surface of the roofing shingle to prevent sticking of the adjacent layers of the roofing material in the package.

Figure 1:
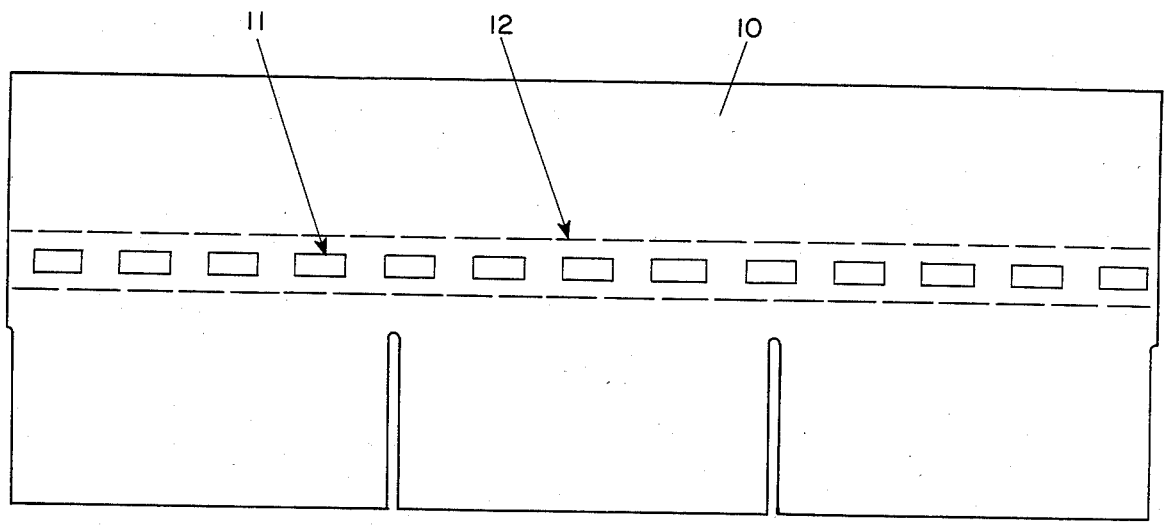
FIG. 1 is a plan view of a roofing shingle showing the application of the sealant material to the face of the shingle and the positioning of the release sheet on the back of the shingle.
Figure 2:
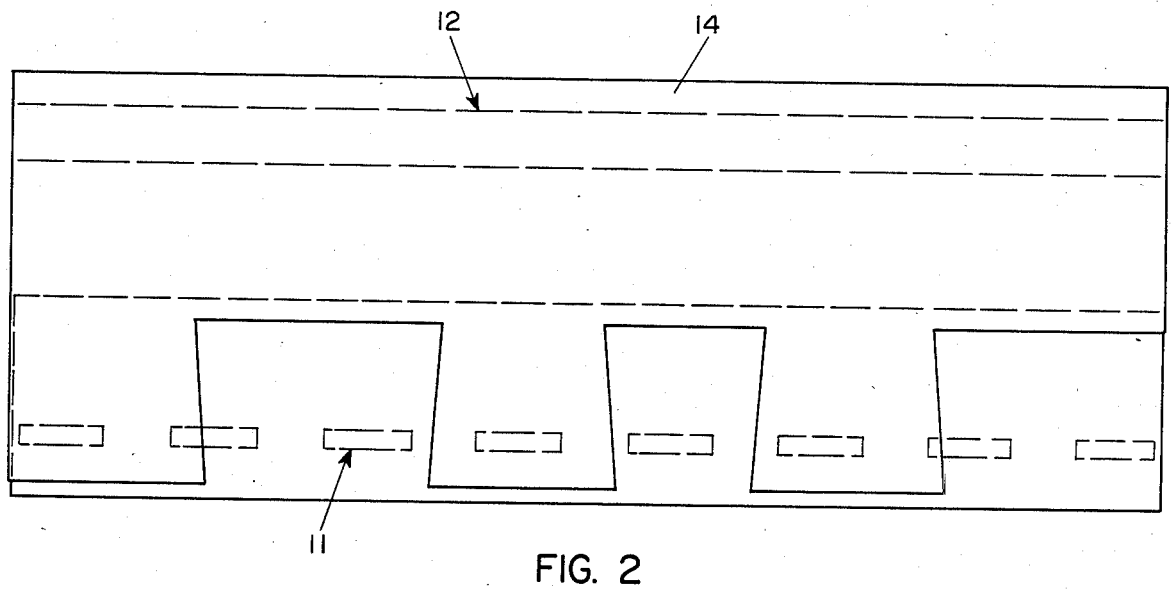
FIG. 2 is a plan view of a roofing shingle showing the application of both the sealant and the release sheet to the back of the single.
Figure 3:
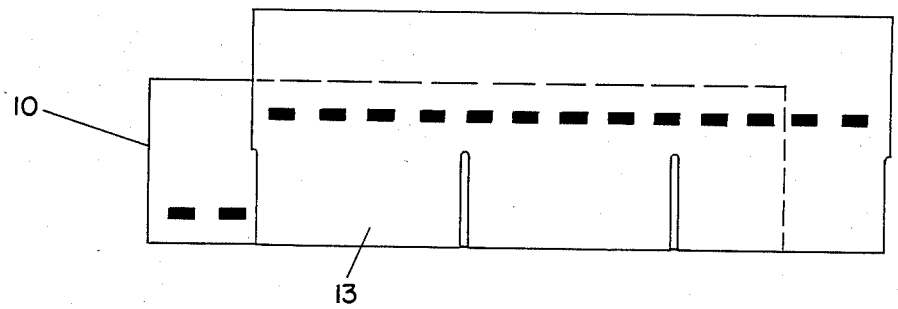
FIGS. 3 and 4 are plan views showing the alignment of shingles sealed together with the stick-down system of the present invention.
Figure 4:
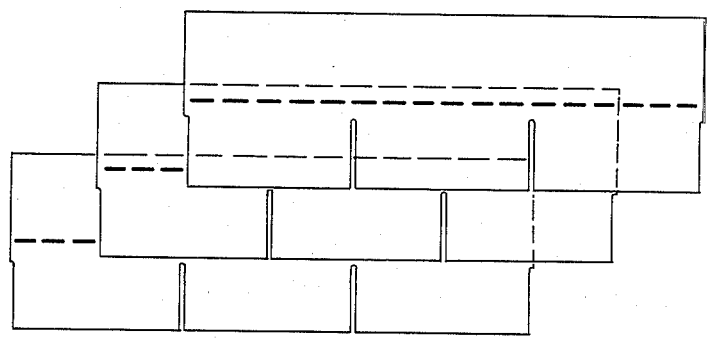
Figure 5:
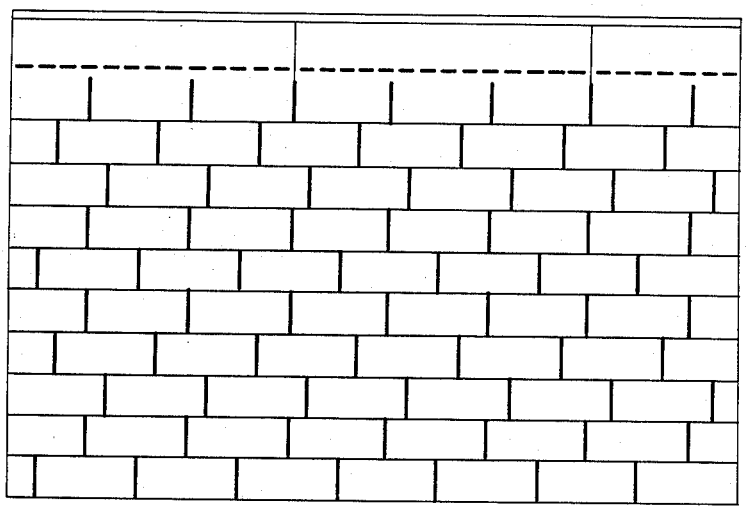
FIGS. 5 and 6 are plan views showing the alignment of shingles sealed together with the stick-down system of the present invention as they are positioned on a roof.
Figure 6:
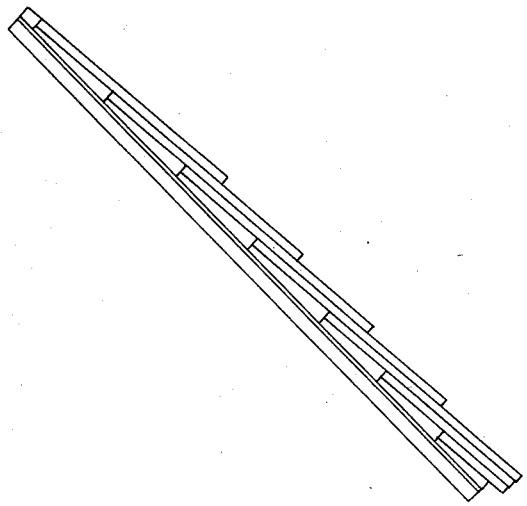

In the present invention, the asphalt shingle manufacturing procedure also includes the step of applying compounded bituminous material as sealant as shown in FIGS. 1-4. The compounded bituminous material may be applied to either the face or the back of the shingle to permit the shingle to adhere to an adjacent surface. In FIG. 1, the sealant 11 is applied to the face of the shingle 10. A release sheet 12 is adhered to the back of the shingle 10. When the shingles 10 are packaged for storage, sealant 11 of one shingle is positioned face-to-face with release sheet 12 of an adjacent shingle to prevent premature adhesion of the shingles. When positioned on a roof, the shingles are aligned as shown in FIG. 3 such that the sealant on the face of the shingle 10 adheres to the back of shingle 13.

In FIG. 2, both the sealant 11 and the release sheet 12 are applied to the back of the shingle 14. In this embodiment, the shingles are positioned during packaging such that the sealant 11 and release sheet 12 of one shingle are positioned face-to-face with the release sheet 12 and sealant 11, respectively, of an adjacent shingle.

As heretofore noted, the compounded bituminous material generally used in the art has a sealing or adherence activation temperature in the range of 140°-160° F. to prevent premature activation during packaging and storage. The presence of the release sheet in the instant invention, however, allows for the use of a sealant material having a significantly reduced activation temperature. Heretofore, if winds having a velocity in the neighborhood of 50 mph or more arose before the roof achieved the required activation temperature of 140°-160° F., then many shingles were lost from the roof. However, the preferred embodiment of the present invention employs a sealant material which can be activated at temperatures as low as 90° F. The problem of premature activation of the sealant during packaging and storage is solved by the application of the release sheet 12 which permits the shingles to be aligned during packaging such that the release sheet of one shingle is contiguous with the sealant of the adjacent shingle.

The sealant of the present invention is comprised of compounded bitumen particularly prepared to impart aggressive tackiness at ambient temperature. This is accomplished by blending natural or synthetic rubber and/or natural or synthetic resins into the bitumen. The terms "bituminous" and "bitumen" as used herein include substances known in the trade as "asphalt"; petroleum asphalt is the preferred bitumen. The blending materials can be selected from any of those well-known as improving ordinary bitumen in its physical properties, especially in modifying its temperature behavior. The rubbers which are useful according to this invention include, for example, vulcanized or non-vulcanized rubbers of the types including styrene-butadiene (SBR), acrylonitrile-butadiene (NBR), chloroprene rubber (CR), butadiene rubber (BR), isoprene rubber (IR), butyl rubber (IIR), ethylene-propylene rubber (EPR), ethylene-propylene diene monomer (EPDM), polyisobutylene (PIB), chorinated polyethylene (CPE), natural rubber (NR), and reclaimed rubbers.

The natural or synthetic resins which may be employed in this invention include, for example, rosin or its derivatives, (i.e.: estergum), tall oil resins, cumaroneindene resins, terpene resins (both natural and synthetic) various petroleum resins, and polyolefins (e.g., polybutene).

In the practice of this invention, it has been found that only a very small amount of rubber and/or resin needs to be present in the compounded bitumen sealant. For most applications, a relatively high degree of tackiness is desired. Therefore, generally at least about 5% by weight (based on the weight of the bitumen) of rubber and/or resin should preferably be present in the compounded bitumen sealant. While there is no apparently critical upper limit with regard to the amount of rubber and/or resin that can be used to effectively improve the tackiness and temperature performance of the compounded bitumen product, process parameters and cost considerations indicate that the preferred total amount of rubber and/or resin present in the compounded bitumen sealant is within the 3% to 20% by weight range.

Some additives, such as softeners (i.e.: petroleum oil), filler (i.e.: powdered mica, limestone, etc.) and the like can also be incorporated into the compounded bitumen sealant.

Typical formulations of the present invention which exhibit utility as factory-applied compounded bitumen sealant are described as follows:

| | | |
|---|---|---|
| I. | Roofer's flux[1]: | 50-58%* range |
| | SBS - 1[2]: | 12-4% range |
| | Filler[3]: | 38% |
| II. | Asphalt Resin[4]: | 50-58% range |
| | SBS - 1[2]: | 12-4% range |
| | Filler[3]: | 38% range |
| III. | Formulation"I": | 70-99% range |
| | Asphalt resin[4]: | 30-1% range |
| *All percentages herein are listed by weight. | | |
| IV. | Ashpalt resin[4]: | 88-96% range |
| | Polyisobutylene[5]: | 12-4% range |
| V. | Asphalt resin[4]: | 88-96% range |
| | Acrylic resin[6]: | 12-4% range |
| VI. | Asphalt resin[4]: | 50-58% range |
| | Acrylic resin[6]: | 12-4% range |
| | Filler[3]: | 38% |
| VII. | Roofer's flux[1]: | 50-58% range |
| | Ashpalt resin[4]: | 38-1% range |
| | Polyisobutylene[5]: | 12-4% range |
| VIII. | Asphalt resin[4]: | 28% |
| | Polyisobutylene[5]: | 6% |
| | Roofer's flux[1]: | 60% |
| | Silicon Dioxide[7]: | 3% |
| | Terpene[8]: | 3% |
| IX. | Roofer's flux[1]: | 85-95% range |
| | SBS-2[9]: | 15-5% range |

[1]Untreated Asphalt (or vacuum distillation bottoms) softening point = 90–110° F.; penetration = 250 at 77° F.
[2]Styrene - Butadiene - Styrene block copolymer 31/69 (styrene/rubber ratio), e.g. KRATON sold by the Shell Oil Co.
[3]Almost any stable inorganic particulate not exceeding 5% plus 60 mesh (i.e.: limestone, sand, calcium carbonate, vermiculite and magnesium carbonate).
[4]Solvent extracted resinous fraction of asphalt (softening points = 160–195° F.; penetration = 3–12) at 77° F.
[5]Low molecular weight, e.g. VISTANEX sold by the Exxon Corporation.
[6]Low molecular weight acrylic copolymer containing 3-15 weight percent carboxyl functionality, e.g. CARBOSET sold by the B.F. Goodrich Co.
[7]Amorphous Silicon Dioxide (0.007 to 0.014 micron particle size), e.g. CAB-O-SIL sold by Cabot Corporation or SILICA GEL sold by Davidson Industries.
[8]Hydrocarbgon resin, e.g. WINGTACK sold by the Goodyear Tire and Rubber Co.
[9]Styrene - Butadiene - Styrene block copolymer 30/70 (styrene/rubber ratio); e.g. KRATON.

Specific examples of these formulations are listed below in Table I:

TABLE I

| | | |
|---|---|---|
| A. | Roofer's flux[1]: | 52%* |
| | SBS - 1[2]: | 10% |
| | Filler[3]: | 38% |
| B. | Asphalt resin[4]: | 52% |
| | SBS - 1[2]: | 10% |
| | Filler[3]: | 38% |
| C. | Formulation "A": | 70-99% |
| | Asphalt resin[4]: | 30-1% |
| D. | Asphalt resin[4]: | 90% |
| | Polyisobutylene[5] | 10% |
| *All percentages herein are listed by weight. | | |
| E. | Asphalt resin[4]: | 90% |
| | Acrylic resin[6]: | 10% |
| F. | Asphalt resin[4]: | 52% |
| | Acrylic resin[6]: | 10% |
| | Filler[3]: | 38% |
| G. | Roofer's flux[1]: | 20% |
| | Asphalt resin[4]: | 70% |
| | Polyisobutylene[5]: | 10% |
| H. | Asphalt resin[4]: | 28% |
| | Polyisobutylene[5]: | 6% |
| | Roofer's flux[1]: | 60% |
| | Silicon Dioxide[7]: | 3% |
| | Terpene[8]: | 3% |
| I. | Roofer's flux[1]: | 90% |
| | SBS - 2[9]: | 10% |

[1]Untreated Asphalt (or vacuum distillation bottoms.) softening point = 90–110° F.; penetration = 250 at 77° F.
[2]KRATON
[3]Calcium carbonate.
[4]Solvent extracted resinous fraction of asphalt (softening points = 160–195° F.; penetration = 3–12) at 77° F.
[5]VISTANEX
[6]CARBOSET
[7]CAB-O-SIL
[8]WINGTACK
[9]KRATON The softening point (°F.) and activation temperature (°F.) of each of the examples were measured and the results appear in Table II below:

TABLE II

| Example | Softening Point (ring and ball °F.) | Activation Temperature (°F.) |
|---|---|---|
| A | 185-200 | 115-130 |

TABLE II-continued

| Example | Softening Point (ring and ball °F.) | Activation Temperature (°F.) |
|---------|-------------------------------------|------------------------------|
| B       | 202–308                             | 155–160+                     |
| C       | 175–240                             | 135–160+                     |
| D       | 150–170                             | 120–130                      |
| E       | 140–160                             | 110–120                      |
| F       | 172–185                             | 125–140                      |
| G       | 132–168                             | 105–150                      |
| H       | 146                                 | 90                           |
| I       | 146–260                             | 95–110                       |

Activation temperature was measured by heating a shingle in contact with another shingle for two hours in an oven, removing the heated shingles, cooling them to room temperature, and checking them incrementally for adhesion until a good bond was achieved.

It can thus be seen that the sealant compositions of the instant invention which comprise about 90% roofer's flux (vacuum bottoms of 90° F. softening temperature) and about 10% of a styrene-butadiene rubber have an activation temperature which is significantly below that of conventional stickdown materials, viz. 140°–160° F. Although the examples containing substantial amounts of asphalt resin did not achieve a good bond until activation temperatures in the 140°–160° F. range were reached, these formulations were nonetheless improvements over the prior art. The sealant employed in these examples, like all sealants made in accordance with the present invention, possesses an aggressive tackiness characteristic which causes the sealant to "grab" onto an adjacent surface and hold it. This provides additional time for the activation temperature to be achieved and permits the adherence of shingles which may have otherwise been lost from the roof.

The formulations of the instant invention also demonstrated remarkable shear resistance as shown by the data in Table III below:

TABLE III

| Example (activation temp) | Shear Resistance | |
|---------------------------|------------------|---|
| Control (industry standard) | 0° F. | 160° F. |
| (140° F.) | 85#3"* | 8#/3"* |
| A  (125° F.) | 123#/3"* | 7#/3"* |
| I  (95° F.)  | 167#/3"** | 9#/3"* |
| I  (105° F.) | 127#/3"** | 11#/3"* |
| I  (95° F.)  | 114#/3"** | 6#/3"* |
| I  (95° F.)  | 101#/3"*** | 6#/3"* |
| D  (125° F.) | 131#/3"*** | 9#/3"* |

\* - All adhesive failures
\*\* - All shingle failures
\*\*\* - 60% shingle failures, 40% adhesive failures Shear resistance was measured by pulling pre-combined shingles apart in a planar motion and measuring the force required to separate them. In the preferred embodiment of the instant invention, the internal strength of the shingle failed before the adhesive failed. This characteristic of this system greatly exceeds industry standards. Accelerated aging studies of shingles sealed in accordance with the present invention exhibited no significant loss in shear strength properties.

The typical formulations of the instant invention also exhibit utility as an adhesive medium for laminated membrane or shingles. The principal advantage of this material over conventional asphalt laminating adhesives is its low temperature adhesion and flexibility.

The utility of this material as a web pre-saturant prior to asphalt coating is also exceptional. Properly formulated and properly applied, web physical properties of tear resistance and tensile strength are enhanced at least ten fold, and with specific formulations, as much as sixty fold.

The release system is a vital component of this invention which facilitates acceptable package, storage, and installation performance. The release system must exhibit little or no affinity for the compounded bitumen sealant and must exhibit no negative impact on the initial tackiness of the sealant, and on the subsequent utility of the sealant in application and long term performance. In addition, it must permit ready manual separation of the shingles at ordinary ambient temperatures. Practically, the release system includes, for example, sheet materials including various films (i.e.: cellophane, polyester, polypropylene, polyethylene, polyvinylalcohol and polyvinylchloride), paper, foil, and the like which has been subjected to surface-treatment such as coating and/or impregnating with synthetic resins having high release properties (e.g., silicone resins and fluorocarbons). Especially, the sheet material coated and/or impregnated with cured silicone resin on the surface thereof is most preferable in use because of its releasability. Additionally, release coatings (i.e.: silicone resin and fluorine containing resins) can be directly applied to the shingle by conventional application methods (i.e.: spray application).

While there have been described what are believed to be preferred embodiments of the invention, those skilled in the art will recognize that other and further modifications may be made thereto without departing from the spirit of the present invention, and it is intended to claim all such modifications as fall within the true scope of the invention.

We claim:

1. A roofing membrane having superposed on at least one surface:
   (a) a compounded bitumen sealant consisting essentially of untreated roofer's flux and from about 3% to 20% by weight of rubbers, thermoplastic resins, and mixtures thereof, wherein said compounded bitumen exhibits high tackiness at ambient temperature and is adhesive to an adjacent asphalt shingle; and
   (b) a release sheet having a release substance selected from the group consisting of silicone resins, fluorine-containing resins and polyvinylidene chloride; wherein said sealant is superposed at one or more positions on one area of said membrane and said release sheet is superposed on another area of said membrane.

2. A roofing membrane according to claim 1 wherein said compounded bitumen is adhesive to an adjacent shingle at temperatures in the range of from 90° F. to 130° F.

3. A roofing membrane according to claim 1 wherein said compounded bitumen also includes asphalt resin.

4. A roofing membrane according to claims 1 or 3 wherein said rubber is selected from the group comprising styrene-butadiene (SBR), acrylonitrile-butadiene (NBR), chloroprene rubber (CR), butadiene rubber (BR), isoprene rubber (IR), butyl rubber (IIR), ethylene-propylene rubber (EPR), ethylene-propylene diene monomer (EPDM), polyisobutylene (PIB), chlorinated polyethylene (CPE), natural rubber and reclaimed rubber.

5. A roofing membrane according to claims 1 or 3 wherein said resins are selected from the group comprising rosin or its derivatives, tall oil resins, cumaroneindene resins, natural and synthetic terpene resins, petroleum resins and polyolefins.

6. A roofing membrane according to claims 1 or 3 wherein said compounded bitumen includes additives selected from the group comprising petroleum oil, limestone, sand, calcium carbonate, vermiculite, magnesium carbonate and silicon dioxide.

7. A roofing membrane according to claims 1 or 3 wherein said release sheet is selected from the group comprising cellophane, polyester, polypropylene, polyethylene, polyvinylalcohol, polyvinylchloride, paper and foil.

8. A roofing membrane according to claims 1 or 3 wherein said compounded bitumen consists essentially of untreated roofer's flux and styrene-butadiene-styrene block copolymer.

9. A roofing membrane according to claims 1 or 3 wherein said release substance is cured silicone resin.

10. A compounded bitumen adhesive medium for laminated roofing membrane which consists essentially of untreated roofer's flux and from about 3% to 20% by weight of rubbers, thermoplastic resins, and mixtures thereof.

11. The compounded bitumen adhesive medium of claim 10 which also includes asphalt resin.

12. A compounded bitumen pre-saturant for coating a roofing membrane which consists essentially of untreated roofer's flux and from about 3% to 20% by weight of rubbers, thermoplastic resins, and mixtures thereof.

13. The compounded bitumen pre-saturant of claim 11 which also includes asphalt resin.

* * * * *

UNITED STATES PATENT AND TRADEMARK OFFICE
CERTIFICATE OF CORRECTION

PATENT NO. : 4,559,267

DATED : December 17, 1985

INVENTOR(S) : John G. Freshwater et al.

It is certified that error appears in the above-identified patent and that said Letters Patent is hereby corrected as shown below:

Col. 2, line 14, "singles" should read --shingles--;

Col. 3, line 60, "Ashpalt" should read --Asphalt--;

Col. 3, line 68, "Ashpalt" should read --Asphalt--;

Col. 5, line 41, "Control (industry standard" should appear below the line in the heading; and Co. 8, line 16, "11" should read --12--.

Signed and Sealed this

Third Day of June 1986

[SEAL]

Attest:

DONALD J. QUIGG

Attesting Officer

Commissioner of Patents and Trademarks